Patented Nov. 1, 1932

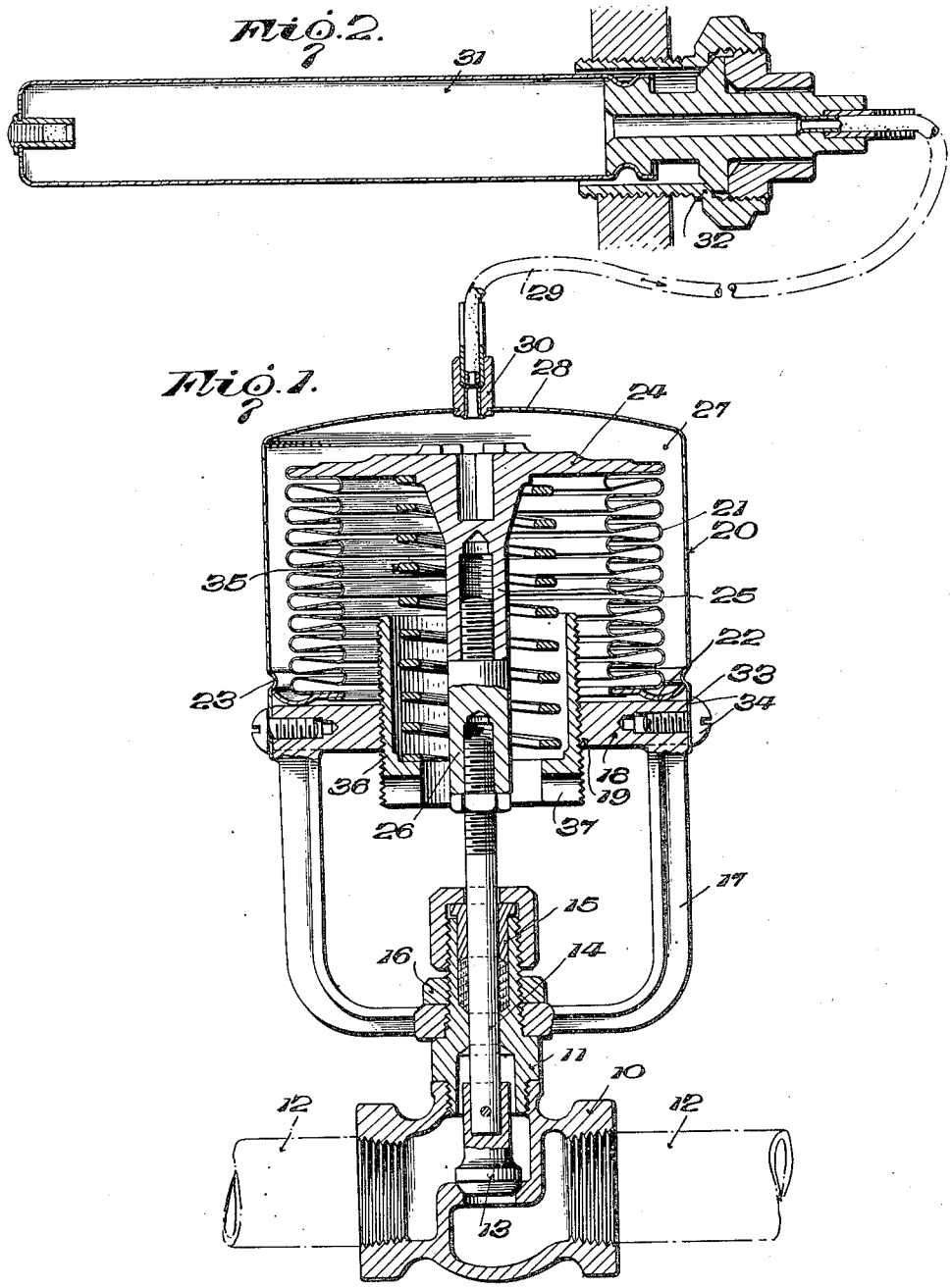

1,885,711

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

TEMPERATURE OR PRESSURE REGULATOR

Application filed April 1, 1929. Serial No. 351,795.

This invention relates to temperature and pressure regulators, and more particularly to regulators of the type employing an expansible and collapsible container which communicates with a source of pressure and has a movable wall connected to a valve or other means to be controlled.

It is an object of this invention to provide an improved device of the type characterized which is of simplified design and which is also strong and durable, neat in appearance, relatively inexpensive to manufacture and assemble, and efficient in operation.

Another object of this invention is to provide a device of the type characterized which employs a corrugated flexible tubular wall and which does not require the protection of an extra casing enclosing the expansible and collapsible container.

Other objects of the invention will appear as the description proceeds.

The invention is capable of receiving a variety of mechanical expressions, one of which has been shown on the accompanying drawing, but it is to be expressly understood that the drawing is for purposes of illustration only, and is not to be construed as a definition of the limits of the invention, reference being had to the appended claims for that purpose.

Referring in detail to the drawing,

Fig. 1 is an axial section of an embodiment of the present invention; and

Fig. 2 is an axial section of one type of device which may be used as the source of pressure for the expansible and contractible container of Fig. 1.

In the form shown, 10 designates any suitable valve housing provided with a bonnet 11 and inlet and outlet connections 12. Mounted within the housing 10 is a valve 13 of any suitable type and which may be taken as typical of any suitable means to be controlled. Valve 13 is provided with a stem 14 which passes through any suitable packing gland 15. Mounted on the bonnet 11 and suitably retained thereon, as by a nut 16, is an open frame 17 of any suitable size and construction, the same being shown as provided with a transverse member 18 having a central threaded aperture 19.

Mounted on said frame 17 is an expansible and contractible container having an outer wall 20 in the form of a cup the lateral wall of which is generally cylindrical and the end wall of which may be convex as illustrated or otherwise suitably shaped. Said cup may be of any suitable material and formed in any suitable way, as by drawing the same from sheet material. Mounted within the outer cup 20 is an expansible and contractible wall 21 of any suitable character, the same being shown as a corrugated tubular wall preferably formed of thin resilient metal. One end of said inner flexible wall 21 is suitably attached, as by soldering or brazing, to an annular wall 22, which is also suitably attached to the outer wall 20 of the container in any suitable way and at some distance from the open end of the said outer wall. As shown said outer wall is provided with an inwardly directed bead 23 which forms a shoulder against which the annular wall 22 may be positioned and to which it may be attached in any suitable way, as by soldering. The opposite end of the flexible wall 21 is suitably attached, as by soldering or brazing, to the rigid movable end wall 24, shown as provided with a threaded boss 25 to which the valve stem is attached in any suitable way, as by the coupling member 26.

The chamber 27 between the rigid outer wall 20 and the flexible inner wall 21, completed by the annular wall 22 and the end wall 28 of the cup, constitutes an expansible and collapsible chamber which is placed in communication in any suitable way with a suitable source of pressure. As shown, a conduit or pipe 29 is suitably attached to the end wall 28, as by a nipple 30, and may be either rigid or flexible. Pipe 29 communicates with any suitable source of pressure, shown as a bulb 31 designed to be mounted by a suitable fitting 32 in heat interchanging relation with the source of temperature to be controlled. Obviously pipe 29 could communicate with any other suitable chamber or source of fluid under pressure, but as shown the bulb 31, the expansible and collapsible container 20, 21, and the interposed pipe 29 constitute a thermostat which may be charged with any suitable volatile fluid, or with a liquid or gas, depending upon the use to which the device is to be put.

The expansible and collapsible container 20, 21 is mounted on the frame 17 by passing the open end 33 of the outer cup like wall 20 over the periphery of the frame 17 and securing it thereto in any suitable way as by screw 34.

To determine the temperature or pressure at which the expansible and collapsible container 20, 21 may start to expand, the movement of the end wall 24 is opposed by a coil spring 35 which bears against the movable end wall 24 at one end and has its opposite end received within a tubular nut 36 that constitutes an adjustable abutment for said spring. Nut 36 is received within the threaded opening 19 of the frame member 18 and may be adjusted to vary the tension of the spring 35 by threading said nut inwardly or outwardly with respect to the frame member 18. To this end said nut may be provided with spanner slots 37.

Changes of pressure within the bulb 31 or other chamber communicating through the pipe 29 with the chamber 27 produce movement of the movable end wall 24 to actuate the valve stem 14 as determined by the tension of the adjustable coil spring 35.

It will thus be perceived that a regulator has been provided wherein the outer wall of the expansible and collapsible chamber constitutes its own casing for the expansible and collapsible device, because it can be made of any suitable material and of such form, strength and rigidity as to meet the needs of the conditions at the place of installation, without the necessity of surrounding it with a protecting case as has been customary where the exterior wall of the expansible and collapsible chamber has been composed of a corrugated flexible wall which is of necessity made of relatively thin material and hence easily injured unless properly protected. At the same time the regulator of the present invention is of simplified design, neat in appearance, efficient in operation, and relatively inexpensive to manufacture and assemble, since the outer casing can be readily made by drawing it from sheet metal, or by casting or drop forging if desired, and the end wall 22 may be stamped out of sheet metal while the assembling operations are chiefly soldering or brazing—all operations requiring relatively unskilled labor.

While the embodiment illustrated on the drawing has been described, with considerable particularity, it is to be expressly understood that the invention is not restricted thereto as the same is capable of receiving other mechanical expressions some of which will now readily suggest themselves to those skilled in the art. While the invention has been shown as embodied in a thermostat, the pipe from the expansible and collapsible container may lead to any other suitable source of pressure or container, whether temperature responsive or not, and said expansible and collapsible container may be actuated by changes of pressure in any suitable pressure medium with which said pipe 29 communicates. Changes may also be made in details of construction, material, arrangement and proportion of parts without departing from the spirit of this invention. Reference is therefore to be had to appended claims for a definition of the limits of the invention.

What is claimed is:

1. In a device of the character described, in combination with means to be controlled, an expansible and collapsible container having a rigid cup-like outer wall and a flexible corrugated inner wall, said cup-like wall also constituting the outer wall of the device, a movable end wall for said corrugated wall, a spring opposing movement of said movable end wall and substantially housed within said flexible wall, mean connecting said movable end wall with said means to be controlled, and an elongated hollow member embracing said spring and projecting within said flexible wall for guiding and adjusting said spring, said container being adapted to be connected with a source of pressure.

2. In a device of the character described, in combination with means to be controlled, an expansible and collapsible container having a rigid cup-like outer wall and a flexible tubular inner wall attached to said outer wall at a distance from the open end thereof whereby said outer wall projects beyond the end of said flexible wall and constitutes an integral axially extending flange, a frame projecting within said flange and attached thereto, and means connecting said flexible wall with said means to be controlled, said container being adapted to be connected with a source of pressure.

3. In a device of the character described, in combination with means to be controlled, an expansible and collapsible container provided with a rigid cup-like outer wall and a flexible corrugated inner wall, an annular wall attached to one end of said corrugated wall and to said cup-like wall and within the same, a frame provided with an integral transverse apertured member projecting within and attached to the open end of said cup-like wall and on which said container is mounted, a movable end wall for said corrugated wall, a spring opposing movement of said movable end wall and substantially housed within said flexible wall, means connecting said movable end wall with said means to be controlled, and means mounted within the aperture of said transverse member for adjusting said spring, said container being adapted to be connected with a source of pressure.

4. In a device of the character described, in combination with a valve, a housing therefor including a bonnet and a valve stem projecting through said bonnet, a frame mounted on said bonnet and projecting parallelly to said stem, said frame being provided with a transverse member remote from said bonnet, an expansible and collapsible container having a rigid cup-like outer wall secured at its open end to said transverse frame member, a flexible corrugated inner wall attached to said rigid wall adjacent the open end thereof, a movable end wall attached to said corrugated wall, means connecting said movable end wall with said valve, a spring opposing movement of said movable end wall and substantially housed within said corrugated wall, and means for adjusting said spring, said container being adapted to be connected with a source of pressure.

5. In a device of the character described, in combination with a valve and its housing, a frame provided with a transverse apertured member and mounted on said housing, an expansible and collapsible container having a rigid cup-like outer wall secured at its open end to said frame, a flexible corrugated inner wall attached to said rigid wall adjacent the open end thereof, a movable end wall attached to said corrugated wall, means connecting said movable end wall with said valve, a tubular cup-shaped nut provided with a spring receiving socket and adjustably mounted in the aperture of the transverse member of said frame adjacent the open end of said cup-like wall, and a coil spring between said movable end wall and said nut, said spring being received in and guided by the socket in said cup-shaped nut.

6. In a device of the character described, in combination with a valve and its housing, an open frame mounted on said housing and comprising a plurality of spaced upright supports terminating in an integral transverse member having a threaded aperture, a cup-shaped member threaded in said aperture and having an opening in its bottom, a valve stem projecting through said housing and opening, an expansible and collapsible container mounted on said frame and including a rigid cup-like outer wall having its open end surrounding and secured to the upper ends of said supports, a flexible corrugated inner wall attached to said rigid outer wall adjacent the open end thereof, a movable end wall attached to said corrugated wall, means connecting said movable end wall and valve stem, and a coil spring seated in and guided by said cup-shaped member and engaging said movable end wall, the bottom of said cup-shaped member being adapted for rotation to adjust the tension of the spring and being accessible through the spaces between said upright supports.

In testimony whereof I have signed this specification.

JEAN V. GIESLER.